United States Patent [19]

George et al.

[11] Patent Number: 4,631,224

[45] Date of Patent: * Dec. 23, 1986

[54] HIGH TEMPERATURE, MOLTEN METAL RESISTANT FABRIC COMPOSITION

[75] Inventors: Stephen George; Thomas George, both of Clinton, N.J.

[73] Assignee: Subtex, Inc., Hartsdale, N.Y.

[*] Notice: The portion of the term of this patent subsequent to Mar. 26, 2002 has been disclaimed.

[21] Appl. No.: 764,874

[22] Filed: Aug. 12, 1985

Related U.S. Application Data

[60] Continuation-in-part of Ser. No. 688,693, Jan. 4, 1985, Pat. No. 4,591,516, and a continuation-in-part of Ser. No. 688,709, Jan. 4, 1985, Pat. No. 4,563,219, which is a division of Ser. No. 585,909, Mar. 2, 1984, Pat. No. 4,507,355.

[51] Int. Cl.$^4$ ................................. B32B 7/00
[52] U.S. Cl. .......................... 428/246; 106/18.26; 106/351
[58] Field of Search .................... 428/246, 351; 106/18.26

[56] References Cited

U.S. PATENT DOCUMENTS

| | | | |
|---|---|---|---|
| 2,996,709 | 8/1961 | Pratt | 428/332 |
| 4,282,165 | 8/1981 | Liauw | 260/429.7 |
| 4,358,500 | 11/1982 | George et al. | 428/246 |
| 4,375,493 | 3/1983 | George et al. | 428/246 |
| 4,396,661 | 8/1983 | George et al. | 428/90 |
| 4,428,999 | 1/1984 | George et al. | 428/251 |
| 4,507,355 | 3/1985 | George et al. | 428/246 |

*Primary Examiner*—Theodore Morris
*Attorney, Agent, or Firm*—Scully, Scott, Murphy & Presser

[57] ABSTRACT

A coating (1) an inorganic binder of colloidal silica, monoaluminum phosphate, aluminum chlorohydrate and a catalyst of an alkyl tin halide; (2) an organic binder, and (3) metallic flakes when applied to a base fabric, such as fiberglass, provide a molten metal resistant composition.

9 Claims, No Drawings

HIGH TEMPERATURE, MOLTEN METAL RESISTANT FABRIC COMPOSITION

CROSS-REFERENCE TO RELATED APPLICATIONS

This application is a continuation-in-part of application Ser. No. 688,693, filed Jan. 4, 1985 now U.S. Pat. No. 4,591,516 and application Ser. No. 688,709, filed Jan. 4, 1985 now U.S. Pat. No. 4,563,219, each of which is a division of application Ser. No. 585,909, filed Mar. 2, 1984, now U.S. Pat. No. 4,507,355.

BACKGROUND OF THE INVENTION

1. Field of the Invention

This invention relates to binder coated compositions. More particularly, it relates to an inorganic binder composition which may usefully be employed, in combination with metallic flakes, in preparing molten metal resistant, binder coated compositions. This invention is especially related to metallic flake-binder compositions which may be applied to woven, knitted or non-woven fabrics constructed from textile yarns to provide them with high temperature resistance and resistance to molten metals.

2. Description of the Prior Art

Ceramics and/or glass fibers have been used herebefore to prepare high temperature electrical insulating tape. U.S. Pat. No. 4,358,500 discloses refractory coated insulating compositions wherein the refractory coating, comprising refractory materials and an organic bonding agent, is formed on the surface and, necessarily, the interstices of a porous base fabric, such as a knitted fiberglass fabric. In the presence of extreme temperatures and heat, the refractory materials fuse into the softened surface of the base fabric, enabling it to withstand intense heat, flame impingement, flame abrasion, and elevated temperatures well beyond the normal temperature limitations of the fabric. The resulting fabric structure will have ceramic qualities and will not soften, melt, drip or lose its insulating properties.

Commonly assigned U.S. Pat. Nos. 4,375,493, 4,396,661 and 4,428,999 relate to multi-functional fabric compositions having a refractory coating on one side of the base fabric and a different coating providing a different function on the other side, i.e., the '493 patent—a conductive coating, the '661 patent—a dielectric coating and the '999 patent—a vapor barrier coating.

The inorganic bonding agent disclosed in U.S. Pat. No. 4,358,500 is prepared from colloidal silica, monoaluminum phosphate (MAP) and aluminum chlorohydrate (ACH) by adding the MAP and ACH separately to the colloidal silica which acts as a liquid moderator. Although the compositions containing the inorganic bonding agent of U.S. Pat. No. 4,358,500 may be exposed to high temperatures, no products of combustion in the form of smoke or fumes are produced as with other prior art coated fabrics. Further, the refractory coated compositions prepared with the inorganic bonding agent proved superior to inorganic coatings available for use on fabrics or paper substrates. The latter inorganic coatings could be damaged by water. They could be wet by water and the water could solvate the coating to the point of causing the inorganic coating to dissociate itself from the substrate. Although other binders, such as the acrylics, inhibited this wetting action, they would burn off when subjected to flame and high temperature. The refractory coated substrates disclosed in the '500 patent, on the other hand, are not wetted by water and are not subject to the solvation action of water as are other inorganic coatings. However, despite these advantages, the refractory coated compositions of the '500 patent exhibit a very undesirable feature. This refractory coating must be applied to a porous fabric so that the coating will be placed in the interstices of the fabric. This is necessary to achieve the formation of the refractory coating on this fabric. However, this requires the use of a larger quantity of the refractory coating when preparing these compositions to the extend that the coating in many instances constitutes about 50% of the overall weight of the impregnated base fabric. The result of all this is that when this coated fabric is flexed, the bond of the refractory coating to the substrate is disrupted, and some particles may be released to the surface resulting in "dusting" of the coating. This, of course, is highly undesirable despite the very desirable features of flame and high temperature resistance which are exhibited by these refractory coated compositions.

Parent application Ser. Nos. 688,693 and 688,709 and grandparent application Ser. No. 585,909 (U.S. Pat. No. 4,507,355) disclose an improved inorganic bonding agent which alleviates the problems inherent in the bonding agent disclosed in U.S. Pat. No. 4,358,500. This improved bonding agent is prepared from colloidal silica, monoaluminum phosphate, aluminum chlorohydrate and an organic tin halide catalyst. When this bonding agent is combined with refractory material and applied to base fabrics, the resultant refractory-binder coated compositions do not "dust" as heretofore and have flame and high temperature resistance. This inorganic binder composition is an improvement over the bonding agent disclosed in U.S. Pat. No. 4,358,500 and leads to the use of substantially lower coating weights while providing the same water shedding properties and the same flame and fire protection as the refractory coated compositions disclosed therein. Further, the significantly improved bonding does not require that the coating has to be placed in the interstices of the fabric and, hence, the base fabrics employed need not be porous.

During welding procedures and operations, molten metal globules often create a hazard to workers in the area. Shields made from asbestos have proven satisfactory in the past to screen workers from the hazards of this molten metal. However, environmental dangers posed by asbestos in the workplace have encouraged the development of alternate means to protect workers from the hazards of molten metal. Leached glass fabrics have proven to be satisfactory replacement for the asbestos fabrics employed in welding shields. The substantially higher cost of these leached glass fabric shields makes the development of a less expensive fabric for use in welding shields very desirable.

It is an object of this invention to provide an environmentally acceptable fabric for use in welding shields.

It is another object of this invention to provide an environmentally acceptable welding shield fabric which is less expensive than those presently available.

It is a further object of this invention to provide a fabric which provides a high degree of protection when contacted with molten metal.

SUMMARY OF THE INVENTION

These and other objects of this invention have been achieved by combining the catalyst-containing inorganic binder of the parent and grandparent applications of which this application is a continuation-in-part with an organic binder and metallic flakes to form a coating which when applied to a fabric substrate, such as a fiberglass roving fabric, provides a composition which resists the action of molten metal such as that encountered in industrial welding processes.

More particularly, this invention relates to a molten metal resistant, coated fabric composition comprising:

(a) a base fabric, and (b) a coating on the surface of the fabric comprising (i) an inorganic binder composition colloidal silica, monoaluminum phosphate, aluminum chlorohydrate and an amount of an alkyl tin halide catalyst effective to increase the bonding of said inorganic binder composition to said fabric (ii) an organic binder (iii) metallic flakes having a saucer-like configuration, a particle size range of about 30 to about 150$\mu$ and a thickness of about 0.5 to about 1.5$\mu$, the amounts of said inorganic binder composition and said organic binder being effective to bond said metallic flakes to said fabric.

DESCRIPTION OF THE PREFERRED EMBODIMENTS

The inorganic binder of the parent and grandparent applications referred to above is an improvement of the bonding agent of U.S. Pat. No. 4,358,500 incorporated herein by reference. The terms "binder" and "bonding agent" are used interchangeably herein to describe compositions having the same utility. Thus, the inorganic composition of U.S. Pat. No. 4,358,500 is described therein as a bonding agent while the inorganic composition employed in the present invention, which is an improvement of the bonding agent of U.S. Pat. No. 4,358,500, is described herein as a binder. Both compositions, when applied to an acceptable substrate, will "bond" or "bind" materials to the substrate, although not to the same degree.

Briefly, the inorganic binder of the parent and grandparent applications referred to above employed in the present invention comprises the three components of the bonding agent of U.S. Pat. No. 4,358,500 to which is added a catalyst which promotes the curing of the binder when it is applied to an appropriate surface and increases the bond between this surface and the binder composition. The preferred catalyst is an organo-metallic halide, specifically, a lower alkyl tin halide. The alkyl tin halide catalyst is preferably a trialkyl tin chloride, most preferably, a tri-butyl tin chloride and especially, triisobutyl tin chloride. A particularly preferred catalyst which may be employed in the binder of this invention is a product of Dow Corning Corporation, Midland, Michigan known as Dow Corning catalyst 182A, wherein the active ingredient is triisobutyl tin chloride.

In the practice of the present invention, metallic flakes and an organic binder are added to the catalyst-containing binder of the related applications and applied to a fabric substrate to provide a coated fabric which is resistant to molten metal such as is encountered in welding operations.

When practicing the present invention, an organic binder is employed to formulate the coating applied to the fabric substrate. An organic binder which is compatible with the inorganic binder, the metallic flakes and the fabric substrate should be employed. The function of the organic binder is to increase the bonding action of the inorganic binder so as to bond the metallic flakes to the fabric substrate. In addition, when the coated fabric of the subject invention is subjected to molten metal and the resultant high temperature, the organic binder will produce carbon which will insulate and protect the fabric substrate from the high temperature. Useful organic binders include phenolic resin, urea-formaldehyde resin and the like. A phenolic resin is preferred.

The metallic portion of the coating is in the form of flakes having a saucer-like configuration. The shape of the metal particles or pieces is critical since metal powder, i.e., spherical particles, will not provide the high temperature protection required in the present invention but rather will transfer heat to the underlying fabric substrate. By a means not completely understood, metallic saucer-like flakes apparently arrange themselves in a wall-like pattern when admixed with a mixture of an inorganic binder and an organic binder and applied to a fabric substrate such that they act like a heat sink thereby protecting the fabric substrate. In addition to having a saucer-like configuration, the metallic flakes are generally circular in shape having a particle size in the range of about 30 to about 150 microns, preferably about 50 to about 100 microns and a thickness of about 0.5 to about 1.5 microns, preferably about 1 micron. The metallic flakes may be of stainless steel, nickel, tungsten carbide and the like. Stainless steel flakes are preferred. Flakes of iron have not proven useful in the fabric compositions of this invention and thus should not be employed. In one embodiment, stainless steel flakes supplied by Novamet Company, 681 Lawlins Road, Wyckoff, NJ have proven particularly useful in preparing the coated fabric compositions of this invention. These stainless steel flakes have a density of 6.99 g/cm$^3$, a thickness of 1.0 micron and a U.S. standard sieve screen analysis of +250 of 69.2%, +325 of 18.2% and −325 of 12.6%.

The inorganic binder employed in this invention is liquid and is formed from colloidal silica, the alkyl tin halide catalyst, monoaluminum phosphate and aluminum chlorohydrate. The latter two materials cannot normally be employed in combination since when they are combined, the result is highly exothermic, producing a pliable mass which develops into s solid material. By employing the colloidal silica, which acts as a liquid moderator, the monoaluminum phosphate (MAP) and the aluminum chlorohydrate (ACH) may be used in combination to achieve the desired results. The catalyst further promotes the reaction and achieves an improved bonding between the binder and the fabric substrate.

In formulating the inorganic composition employed in this invention, the quantities of the components may be varied over a considerable range. It is usually convenient to provide the monoaluminum phosphate and the aluminum chlorohydrate in a weight ratio of MAP to ACH of about 0.8:1.0 to about 1.5:1.0, preferably about 1.0:1.0 to about 1.25:1.0. The quantity of colloidal silica to be employed is based on the weight ratio of the liquid colloidal silica to the combined weights of the MAP and the ACH. A weight ratio range of colloidal silica to MAP plus ACH of about 0.6:1 to about 1:1, preferably about 0.75:1 to about 0.85:1 has been found useful. The quantity of catalyst to be employed is based on the weight ratio of the liquid catalyst to the combined weights of the MAP, the ACH and the colloidal silica. A weight ratio range of catalyst to MAP, ACH and colloidal silica of about 0.025:1.0 to about 0.125:1.0, preferably about 0.61:1 to about 0.08:1.0 has been found useful. Preferably, the binder composition should be applied as a coating in a dilute concentration by adding a quantity of water to the combined ingredients. A ratio of the combination of MAP, ACH and colloidal silica to water of about 0.5:1.0 to about 1.0:1.0 can be effectively employed. The water employed should be soft or at least deionized to achieve best results. Additional water may be used as a diluent in various coating techniques without deleterious effects.

After the inorganic binder is prepared, it is combined with the organic binder and the metallic flakes. After being thoroughly but gently mixed, this coating composition is applied to the fabric substrate to form a coating thereon.

The amount of organic binder added to the inorganic binder only constitutes a fraction of the quantity of inorganic binder. In general, the ratio of organic binder to inorganic binder is about 0.01:1.0 to about 0.1:1.0, preferably about 0.03:1.0 to about 0.06:1.0. The metallic flakes also constitute only a fraction of the quantity of inorganic binder. In general, the ratio of metallic flakes to inorganic binder is about 0.01:1.0 to about 0.1:1.0, preferably about 0.03:1.0 to about 0.06:1.0. The combination of inorganic binder, organic binder and metallic flakes forms the coating composition of the present invention.

Since the catalyst promotes the reaction of the components, the coating composition has a definite pot time, usually about 2 to about 3 or more hours. In general, the more water added to the mixture, the longer the pot time.

In preparing this inorganic binder, the required amounts of MAP and ACH are separately added to the colloidal silica. The catalyst, the organic binder, the metallic flakes and the necessary amount of water are added to complete the formulation of the coating composition. This coating may be applied to the fabric substrate and maintained at an elevated temperature for a period of time sufficient to cause removal of the water and permit the MAP and ACH, in the presence of the catalyst, to react slowly producing a slowly thickening material which together with the organic binder bonds the metallic flakes to the surface of the fabric substrate providing a unitary structure having high temperature resistant to the action of molten metal.

When the metallic flake coating has been bonded to the fabric substrate, the resulting coating has an acid pH which should be neutralized or the chemical bonding action will continue slowly over a period of time causing the underlying fabric to lose some degree of flexibility. This acidity may be neutralized by a dilute alkali solution of ammonia, caustic and the like. The solution may be sprayed onto the coated fabric or the fabric may be passed through a bath of the dilute alkali solution. Following the neutralization, the coated fabric can be air dried or slowly dried in streams of warm air. Where loss of fabric flexibility creates no particular problem, the neutralization step can be eliminated.

The surface of the refractory coated fabric composition prepared in accordance with this invention may appear to be slightly abrasive. To remove this abrasiveness and to improve the flexibility and the "hand" of the coated fabric, a silicone elastomer coating may be applied to the metallic flake coating. A coating of a silicone elastomer can be formed on the coated fabric by applying a one-component, water-based emulsion of a silicone elastomer, such as a product known as Dow Corning Q3-5025. This one-component silicone material is cured by simple evaporation of water at room temperature. The evaporation of water may be accelerated at elevated temperatures. The water-based silicone elastomer emulsion provides a desirable side effect since it neutralizes the acid pH of the refractory coating. Thus, when a silicone rubber coating is applied to the compositions of this invention, there is no need to employ the dilute alkali neutralization described above. The resulting silicone rubber coated fabric is smooth to the touch and is easily handled. The silicone coating provides a very flexible product since not only does it stop the catalyzed reaction and the further hardening of the coating, but it lubricates the surfaces of the metallic flake coated fabric so that these surfaces can rub together with less friction and add flexibility to the fabric composition.

The metallic flake coating prepared in accordance with this invention may be applied to a wide variety of fabric substrates and will achieve a good bond even if the fabric has a smooth surface.

The base fabrics which form the substrate for the compositions of this embodiment may be composed of a wide range of materials including natural or synthetic materials or mixtures thereof. Thus, fabrics containing such natural materials as cotton, silk, wool, and the like and such man-made and polymeric materials as glass, mineral wool, nylon, dacron, aramid, and the like, alone or in combination, may be employed.

Although the metallic flake coating of this invention will provide high temperature properties to the base fabric, it will not render combustible material in the fabric non-combustible. However, any non-combustible fabric or any combustible fabric which can be rendered fireproof will have its flame resistance increased to a higher threshold when the metallic flake coating prepared in accordance with this invention is applied to such fabric. Phosphate treatment of cellulosic material and similar treatments known in the art for other combustible materials will render these materials flameproof.

As used herein, the term "fabric" includes materials which are woven, knitted or non-woven. Non-woven fabrics herein include an assembly of textile fibers held together by mechanical interlocking in a web or mat by such procedures as needle punching, by fusing of the fibers or by bonding with a cementing medium. In most instances, the "fabrics" employed herein will be constructed from interlocking yarns, fibers or filaments.

A fabric preferred in this invention is one composed of fiberglass. This substrate may be woven fiberglass, knitted fiberglass or a non-woven web of fiberglass. A particularly preferred fabric is composed of fiberglass texturized roving.

As will be understood by those skilled in the art, a fiberglass substrate fabric, though it may be formed of all fiberglass yarns, may also be constructed of combinations of fiberglass yarn with other fire resistant yarns.

The following serves to illustrate the subject invention.

An inorganic composition usefully employed in this invention contains the following ingredients, listed in their order of addition:

TABLE I

Stainless Steel Flake Coating Formula

| | | Parts by Weight |
|---|---|---|
| 1. | Water | 30 |
| 2. | Colloidal Silica, Nyacol 2034DI (34% Solids) | 10 |
| 3. | Monoaluminum Phosphate (MAP) (42% Solids) | 5 |
| 4. | Aluminum Chlorohydrate (ACH) (32% Solids) | 5 |
| 5. | Dow/Corning Catalyst 182A (21% Solids) | 3 |
| 6. | Water | 125 |
| 7. | Urea-Formaldehyde Polymer Type 21-134 WETstrex | 10   135 |
| 8. | Stainless Steel Flake (Novamet) | 10 |
| | Total | 198 |

The liquid coating composition, such as that of Table I, is formed by slow addition of MAP to the mixture of water and colloidal silica while mixing, followed by the slow addition of the ACH while mixing. Mixing should be continued while the catalyst is added and is continued until a slight increase in viscosity occurs and a smooth consistency is achieved. The colloidal silica and the water acts as a moderator to delay the rapid exothermal chemical reaction that would normally occur when MAP is mixed with ACH. Although the rapid chemical reaction between the MAP and ACH is greatly slowed by the colloidal silica and water moderator, a partial reaction does occur which is the cause of the initial viscosity increase when ACH is added to the mixture. After the catalyst action starts, the organic binder is added with the final addition of water. The metal flakes are the final ingredient added to the mixture. The combined ingredients are then slowly but thoroughly mixed to provide a uniform composition. The catalyst further promotes the reaction which causes both binders, together with the metallic flakes, to become bound to the substrate to which is has been applied.

Curing the metallic flake coating after it is applied to the base fabric may be achieved by any of a number of procedures. Fabric temperatures of about 250° F. are usually effective, although lower or higher temperatures may be employed, where required. An infrared source of heat has been found effective. Equally useful is a stream of forced dry air. Passing the coated fabric through a drying oven in a continuous fashion is an effective drying technique where the composition is being prepared in a continuous operation. The water is removed first and during the course of this, the curing is initiated and is effected by the time the coating is dry.

The dried metallic flake coating may impart a stiffness to the finished fabric composition. Where this stiffness is undesired, it is possible to retain flexibility of the fabric composition by neutralizing the pH of the coating with a dilute alkali solution or a water based emulsion of a silicone rubber as described above.

The metallic flake coated fabric compositions of this invention find use as protection screens, welding curtains, welding shields and the like where protection from molten metal particles is required. In use, these fabric compositions are placed between the person, the object or the article to be protected and the source of the molten metal so that when a particle of the molten metal is propelled in the direction of said person, object or article, the molten metal particle impinges on the surface of the metallic flake coated fabric composition which deflects and/or stops the particle thereby protecting said person, object or article from injury or damage with little or no visible effect on the metallic flake coated fabric composition The practice of the subject invention is illustrated in the following example:

A metallic flake coated fiberglass fabric was prepared as follows:

The ingredients of the coating composition were those of Table I. The ingredients are listed in their order of addition.

Water and colloidal silica were mixed together. While this mixture was continuously being mixed, the remaining ingredients were slowly added thereto. Each ingredient was thoroughly mixed into the mixture before the next ingredient was added. After the addition of the second quantity of water, the organic binder and the stainless steel flakes, the mixing was continued until the mixture was homogenous.

A piece of woven fiberglass textured roving (Garlock Style #800, 25.6 oz/yd$^2$) was placed in the bottom of a shallow flat bottom tray, and the above stainless steel flake-binder mixture was poured over the cloth. The mixture was worked into the surface of the glass cloth until all surfaces were thoroughly wetted. The cloth was then placed on a flat surface and excess quantities of the mixture were removed with a doctor blade to provide a coating, upon drying, of 3.5 oz/yd$^2$. The wetted cloth was then placed under a set of infrared lamps until the coated cloth was dry. The product obtained had a stainless steel flake coating which provided a slightly roughed surface to the cloth and exhibited an acid pH.

A coating of a one-component water based silicone elastomer emulsion was applied to the coated surface of the cloth. This emulsion consisted of 10 parts of Dow Corning Water Based Silicone Elastomer Q3-5025 and 60 parts of water. The wetted cloth was again placed under the infrared lamps until the surface of the cloth was dry. The surface was now smooth, and the cloth had improved flexibility and "hand."

A piece of the coated fiberglass and a piece of the uncoated fiberglass were placed on a flat surface one end of which was elevated at an angle of about 45° above the horizontal, and a quantity of molten steel was poured onto each piece of fiberglass. A hole immediately appeared in the uncoated fiberglass cloth, and the entire piece of fiberglass then melted. The stainless steel flake coated fiberglass, on the other hand, deflected the molten steel which rolled off the surface of the coated fiberglass leaving it intact with some surface discoloration.

What is claimed is:

1. A molten metal resistant, coated fabric composition comprising:
    (a) a base fabric, and
    (b) a coating on the surface of the fabric comprising
        (i) an inorganic binder composition colloidal silica, monoaluminum phosphate, aluminum chlorohydrate and an amount of an alkyl tin halide catalyst effective to increase the bonding of said inorganic binder composition to said fabric
        (ii) an organic binder
        (iii) metallic flakes having a saucer-like configuration, a particle size range of about 30 to about 150$\mu$ and a thickness of about 0.5 to about 1.5$\mu$, the amounts of said inorganic binder composition and said organic binder being effective to bond said metallic flakes to said fabric.

2. A composition according to claim 1 wherein the weight ratio of colloidal silica to monoaluminum phosphate plus aluminum chlorohydrate is about 0.6:1 to 1:1, the weight ratio of monoaluminum phosphate to aluminum chlorohydrate is about 0.8 to 1.0 to about 1.5 to 1.0, the weight ratio of catalyst to the combined weight of the colloidal silica, the monoaluminum phosphate and the aluminum chlorohydrate is about 0.025 to 1.0 to about 0.125 to 1.0, the weight ratio of organic binder to inorganic binder is about 0.01 to 1.0 to about 0.1 to 1.0 and the weight ratio of metallic flakes to inorganic binder is about 0.01 to 1.0 to about 0.1 to 1.0.

3. A binder composition according to claim 1 wherein the alkyl tin halide catalyst is triisobutyl tin chloride.

4. A composition according to claim 1 wherein the metallic flakes are stainless steel, nickel or tungsten carbide.

5. A composition according to claim 1 wherein the organic binder is phenolic resin or urea-formaldehyde resin.

6. A composition according to claim 1 wherein the fabric comprises natural or synthetic fibers.

7. A composition according to claim 1 wherein the fabric comprises glass, aramid, mineral wool or mixtures thereof.

8. A composition according to claim 1 wherein the fabric comprises fiberglass.

9. A composition according to claim 1 wherein a silicone rubber coating is formed over the coating.

* * * * *